April 29, 1969      C. E. FARMAN      3,441,209
GOLF DRIVE METER AND CLUB INDICATOR
Filed Sept. 5, 1967
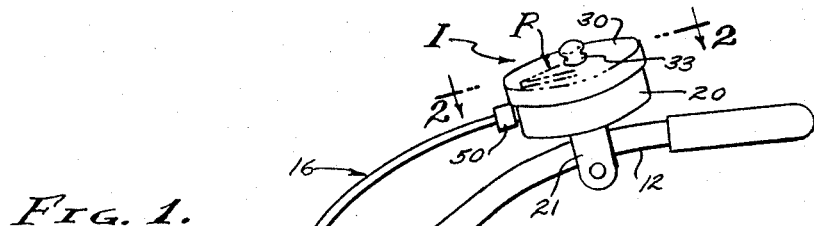
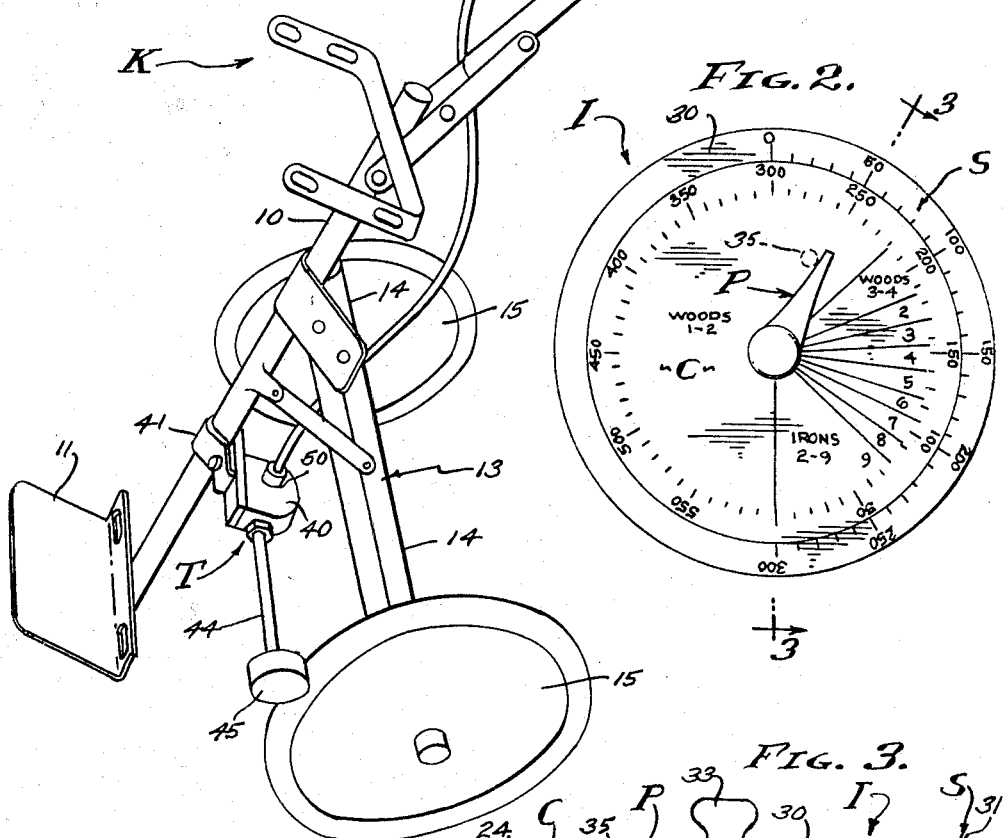
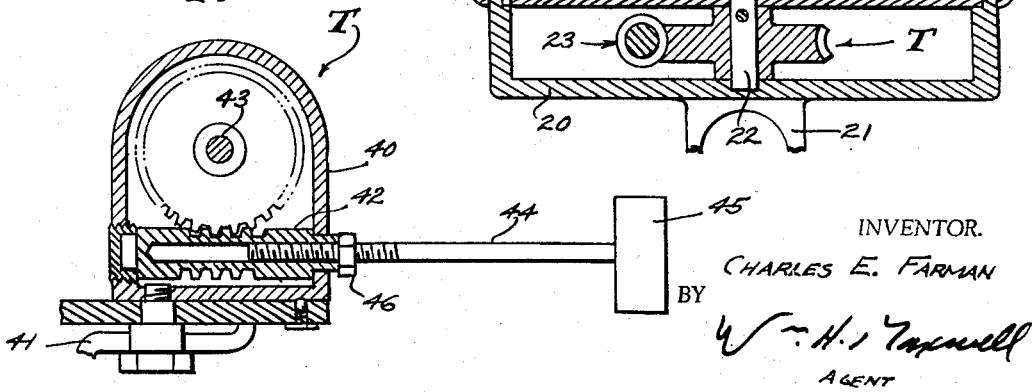
INVENTOR.
CHARLES E. FARMAN
BY
Wm. H. Maxwell
AGENT

United States Patent Office 3,441,209
Patented Apr. 29, 1969

3,441,209
GOLF DRIVE METER AND CLUB INDICATOR
Charles E. Farman, 1521 Roanne Drive,
La Habra, Calif. 90631
Filed Sept. 5, 1967, Ser. No. 665,430
Int. Cl. G01b 3/12, 7/04
U.S. Cl. 235—95                                6 Claims

ABSTRACT OF THE DISCLOSURE

This invention is concerned with the game of golf wherein the distance from the tee to the green varies from hole to hole and wherein the proper use of different golf clubs is determined by the remaining distance along the fairway to the green and according to the proficiency of the golfer; the device disclosed being presettable to meter the distance remaining to the green and to indicate as well the ideal club for use at the distance remaining to the green or hole, and with provision for adjustment or alteration so as to accommodate any individual's golfing proficiency.

---

The meter-indicator of the present invention is applicable to golf carts and the like, that is any device capable of advancing a mechanism in response to a distance traveled. However, the present invention is more than a mere odometer in that, it provides a movable scale for direct and positive metering of the distance traveled; it provides a replaceable calibrated card for direct and positive metering of the distance to be traveled; and it provides a settable indicator that simultaneously points to the scale and calibrated card so as to meter the two distances of concern and as well to positively indicate a certain golf club that is properly useable at any distance arrived at along the fairway. Structurally the invention provides an instrument for convenient location and observation by the golfer and means adapted to gear the instrument to the golf cart or other apparatus as circumstances require. Thus, the instrument and means for implementing the same is in the nature of an attachment, preferably for a golf cart and the like and it is universally adapted to such carts regardless of their construction and supporting wheel diameters, and regardless of the collapsibility of said carts, the instrument and its related means being capable of virtually indiscriminate folding along with the carts.

The concern of a golfer regardless of his or her proficiency, is the proper use of the various golf clubs as related to the distance remaining to the green and hole therein. The golf course is primarily a natural environment and no two courses are alike, the number of holes and arrangement of fairways being distinct and decidedly different with each hole and each course. Consequently, the lengths and directions involved in the various fairways are unique with each hole played, and the golfer's judgement as to distances is an ever present problem. That is, distances are most often deceiving and at best a golfer's judgement as to distance can be an estimate only. Therefore, it is an object of this invention to provide a practical instrument which not only meters the distance traveled but which also meters the distance remaining to be traveled, all in relation to any existing fairway length, and which indicates the proper club for the golfer of a proficiency category selected.

Since golf clubs are most always carried or tended to in a wheel cart, it is most practical to employ the wheel support of the cart for driving the transmission of the instrument. However, a gear drive or the like involves the supporting wheel diameter, but with the present invention there is no such involvment, it being an object to provide a uniform drive to the instrument regardless of the supporting wheel diameter and this being accomplished by using the said supporting wheel as an idler, the drive roll which I provide being the determining factor in uniformity of drive as related to the requirements of the instrument transmission.

Each golfer is an individual whose proficiency can be determined generally and this can be accepted. Consequently, the use of a golf club varies with different golfers and this is a variable which must be taken into consideration when calibrating the card which the instrument employs. For example, a more proficient golfer will ordinarily drive a greater distance with any given club, said clubs being numbered 1 through 9 as they vary in driving capability, and each with differing drive characteristics. Therefore, the use of clubs by number will be spread over a greater distance when dealing with the less proficient golfers, and conversely will be condensed toward the putting green when dealing with the more proficient golfers, all in varying degrees. For this reason, the indication of golf clubs to be used will vary in requirements as related to the distance remaining to the putting green and hole and according to the golfer, it being an object of this invention to correlate these variances. With the instrument herein disclosed there is a calibrated card which is selected by the individual golfer and inserted into the instrument for his personal use in determining the club that he should theoretically use at any position along the fairway being played.

The various objects and features of this invention will be fully understood from the following detailed description of the typical preferred form and application thereof, throughout which description reference is made to the accompanying drawings, in which:

FIG. 1 is a perspective view showing the installation of the golf drive meter and club indicator upon a typical cart. FIG. 2 is an enlarged plan view of the instrument. FIG. 3 is a sectional view taken as indicated by line 3—3 on FIG. 2, and FIG. 4 is a detailed view of the wheel engaging drive as shown in FIG. 1.

The golf drive meter and club indicator as it is shown throughout the drawings is an instrument for attachment to and operation on a vehicle such as a golf cart. It is to be understood that the type of vehicle can vary widely, the only requirement being that the vehicle accompany the golfer and which is invariably the case. A typical collapsible golf cart K is shown in the drawings, for the carriage of a bag of golf clubs (not shown), and which involves generally a vertically disposed columnar frame 10 with a foot 11 for the support of the golf club bag, with a rearwardly disposed handle 12 disposed at its upper end and with straps for securement of the bag thereon, and a retractile wheel support assembly 13. The wheel support assembly 13 involves a pair of downwardly divergent and rearwardly disposed struts 14, each journaling a wheel 15. There are various ways in which the struts 14 are collapsed, a typical arrangement being indicated, but which forms no part of the present invention. It is the typical location of the supporting wheels 15 as related to the frame 10 which is involved and regardless of the wheel diameters and/or kind or condition of the tires thereof.

In accordance with the invention the meter-indicator involves an instrument I having a selectively replaceable proficiency card C, a manually settable distance card S, and a removable pointer P, and it involves a movement transmission means T responsive to progress of the wheel supported cart K along the fairway. As shown, the instrument I is removably attached to the handle 12 and faced upwardly for observation, while the transmission means T is removably attached to the wheel support assembly 13 area of the vehicle and has a flexible element 16 extended to the instrument I for operating the same.

The instrument I is the visible portion of the device, having a case 20 releasably held to the handle 12 by a clamp 21. The case 20 is a closed cylindrical shell that houses a portion of the transmission means T and which has a bearing on its central axis for rotatably supporting a pointer shaft 22. The shaft is advanced clockwise by the means T, upon forward progress of the cart K, in which case a simple worm and pinion drive 23 is encased in the case 20 to so turn the shaft 22.

The proficiency card C is a selectively replaceable element that is calibrated uniformly with regard to the distance remaining to the green and/or hole and variably with regard to the golfer who is involved. As to replaceability, the proficiency card C is a circular element proportioned for superimposed installation upon the case 20, with a central opening for access to the shaft 22 and with a notch for locked engagement with a key 24 on the case. As to the uniform distance-remaining calibrations, the proficiency card C is decreasingly calibrated in yardage progressing clockwise along the peripheral portion thereof. Inasmuch as 300 yds. is a substantial fairway length, half the card is decreasingly calibrated in tens of yards, with a major calibration every 50 yds. The opposite and preceding half of the card is then calibrated up to 600 yds., although a fairway is hardly expected to be quite so lengthy. As to the variable calibrations, they are for the determination of the golf club to be used for that golfer, and in this respect the card is segmentally calibrated as each respectively numbered golf club is intended to be used for the yardage left remaining along the fairway toward the green and hole. For example, No. 1 and No. 2 wood clubs are useable from 600 to 220 yds. from the green; No. 3 and No. 4 wood clubs are useable from 220 to 185 yds. from the green; a No. 2 iron (club) is useable from 185 to 170 yds. from the green; etc. as shown clearly in the drawings; and a No. 9 iron is useable from 80 yds. to the green. It is to be understood, of course, that special putting clubs are then useable upon the green, all as may be desired by the golfer.

The manually settable distance card S is both removable from and revolvable on the case 20 so as to releasably enclose the proficiency card C for observation, so as to visibly house the pointer P, and so as to settably place calibrations provided thereon. In its preferred form the settable distance card S is a disc-shaped closure 30 of transparent material having a scaled peripheral portion 32 separately visible from the above described distance-calibrations. However, the scale of the distance card S is increasingly calibrated in yardage progressing clockwise along said separate peripheral portion. In practice, the calibrations of the scale on distance card S are adjacent to the calibrations of card C. In accordance with the invention, yardage calibrations on distance card S are spaced incrementally identical to the yardage calibrations on card C, half the scale indicating 300 yds., the peripheral portion 31 comprises a depending flange that rotatably embraces the outer diameter of the case 20, having an internal rim to engage over a shoulder on the case. Thus, the distance card S, being substantially resilient, snaps into and out of its installed rotative position, also being frictionally engageable over the case so as to resist accidental rotative displacement.

The movable pointer P is preferably carried by the settable distance card S and it too is settable. That is, both the pointer P and card S are manually positionable as circumstances require, the pointer P to have a starting position and the card S to remain in a set position. To this end, the pointer P is rotatably captured in a bearing opening in the center of the card S, having a sleeve clutch 32 to frictionally engage with shaft 22, and having an external knob 33 for manipulation to the desired setting. Further, a stop lug 35 is provided on the card S for engagement by the pointer P upon reaching a zero yard position with relation to said card. Therefore, turning of the knob 33 counterclockwise will engage the stop lug 35 so that both the pointer P and the distance card S will be movable to a selected yardage position on the card C, for instance 250 yds.

The movement transmission means T is a traction mechanism having a housing 40 releasably held to the frame 10 by a clamp 41. The housing 40 is closed and carries two angularly related shafts, one a drive shaft 42 and the other a driven shaft 43. The two shafts are journaled in the housing as shown, the shaft 42 being disposed on a horizontal axis substantially parallel with the axis of the vehicle wheels 15. As shown, the housing 40 is adjustably pivoted to the clamp 41 on a horizontal axis normal to the axis of shaft 42, whereby the shaft axis can swing toward a wheel 15. Accordingly, the shaft 42 is extended by a resiliently deflectible extension 44 with a roller 45 at its terminal end for pressured traction engagement with the wheel 15. The extension 45 is adjustable axially through its threaded engagement into the shaft 42 where it is secured by a lock nut 46. The transmission is shown as a worm and wheel drive, with a worm or shaft 42 that engages a wheel on shaft 43. The flexible element 16 extends from shaft 43 to the drive 23, through a tubular casing 51 secured in the usual manner to the housing 40 and case 20, as by threaded sleeves 50 in each instance.

From the foregoing it will be apparent how the case 20 and housing 40 are easily held to the frame 10 as by means of respective clamps 21 and 41. The flexibility of the element 16 in its casing 51 provides for any desired adjustments and for collapsibility in which case the housing 40 is pivoted to retract the roller 45 from wheel 15. It is a simple matter to choose the appropriate gear ratios as related to the diameter of roller 45, the wheel 15 engaged therewith simply acting in the capacity of an intermediate motion transferring idler. Having set the pointer P and distance card S at 250 yds., for a fairway of said length, towing of the cart forwardly causes the pointer P to advance relative to the card S and to retract relative to the card C. Therefore, the distance traveled from stroke to stroke is metered so as to indicate separately the distance traveled and the distance remaining to be traveled. And simultaneously, the pointer in relation to the card C also indicates the number designation of the club which will normally be required at the distance of travel arrived at. If the drive distance of each stroke is to be metered, then the distance card S can be reset in each instance, as circumstances require. By proper initial setting of the pointer P all three functions as above enumerated automatically follow through the inherent operation of the instrument as caused by moving it forwardly in the company of the golfer relying upon the same for its accurately metered distance and club indications.

Having described only a typical preferred form and application of my invention, I do not wish to be limited or restricted to the specific details herein set forth, but wish to reserve to myself any modifications or variations that may appear to those skilled in the art.

Having described my invention, I claim:

1. A distance metering instrument for wheeled vehicles and including; a drive means geared to advance forwardly with forward rotation of one of the vehicle wheels during forward progress of said vehicle, a circular proficiency card fixed relative to the drive means and having decreasingly calibrated and circumferentially spaced distance indicia progressing advancively thereon, a manually settable and circular distance card with a scale having increasing calibrated and circumferentially spaced distance indicia progressing advancively thereon and movable both advancively and retractively adjacent to the first mentioned proficiency card calibrations, said two distance calibrations being of the same incremental scale proportions for direct comparison one with the other, and a manually settable pointer revolvable concentrically of the said two cards and with a tip at the arcs described by said card calibrations and advanced by the drive means decreasingly relative to the calibrations on said proficiency card and increasingly relative to the calibrations on said distance card, whereby said proficiency card and pointer are manually settable at a distance to be traveled and so as to commence and continue to indicatively meter both the remaining distance to be traveled and the distance traveled.

2. The distance metering instrument as set forth in claim 1 and wherein, a lug projects from the distance card to limit a retraction of the pointer to a zero position on said scale thereon, whereby manual setting of said pointer simultaneously sets said distance card.

3. The distance metering instrument as set forth in claim 1 wherein the distance card is transparent and superimposed over the proficiency card and with the calibrations thereof circumscribing the proficiency card calibrations.

4. The distance metering instrument as set forth in claim 1 wherein, the distance card is transparent and superimposed over the proficiency card and with the calibrations thereof circumscribing the proficiency card calibrations and wherein a lug projects from the distance card to limit rotative retraction of the pointer to a zero position on said scale thereon, whereby manual setting of said pointer simultaneously sets said distance card.

5. The distance metering instrument as set forth in claim 1 and wherein, the drive means comprises, a traction roller engaged with said one wheel of the vehicle, and a motion transmission advancing the pointer therefrom.

6. The distance metering instrument as set forth in claim 1 and wherein, the drive means comprises, a retractile roller engaged with said one wheel of the vehicle, and a flexible drive shaft to the pointer and which includes a motion transmission advancing the pointer.

References Cited

UNITED STATES PATENTS

| | | | |
|---|---|---|---|
| 2,634,914 | 4/1953 | Lyon | 235—95 |
| 2,711,027 | 6/1955 | Williamson | 235—95 |
| 2,724,361 | 11/1955 | Coffin | 116—129 |
| 3,196,545 | 7/1965 | Zell et al. | 33—141 |
| 3,250,466 | 5/1966 | Tomlinson | 235—95 |

RICHARD B. WILKINSON, *Primary Examiner.*

S. A. WAL, *Assistant Examiner.*

U.S. Cl. X.R.

235—121; 33—141